United States Patent [19]

Wahlbeck

[11] Patent Number: 4,743,148

[45] Date of Patent: May 10, 1988

[54] CHIP BREAKER

[75] Inventor: Ira H. Wahlbeck, Davenport, Iowa

[73] Assignee: Jancy Engineering Company, Davenport, Iowa

[21] Appl. No.: 54,802

[22] Filed: May 27, 1987

[51] Int. Cl.[4] ............ B23C 9/00; B23B 47/34
[52] U.S. Cl. ............................ 409/137; 408/67
[58] Field of Search ......... 409/137; 29/DIG. 52; 408/67, 241 R, 241 B, 72 B, 115 B; 407/2, 3, 4

[56] References Cited

U.S. PATENT DOCUMENTS 3,301,101  1/1967  McEwen ..................... 408/67
4,514,120  4/1985  Hougen ..................... 409/137

FOREIGN PATENT DOCUMENTS 946811  8/1982  U.S.S.R. ..................... 408/67

Primary Examiner—William R. Briggs
Attorney, Agent, or Firm—Robert G. Mentag

[57] ABSTRACT

A chip breaker for use with a rotary cutter for performing a metal cutting operation on a workpiece by advancing the rotary cutter into the workpiece. The chip breaker is provided with a chip breaker plate having a rearwardly and downwardly acute angle chip breaking front edge which is disposed closely adjacent a rotary cutter so as to engage the spiral chips made by the rotary cutter during a cutting operation and to break up the chips and separate them from the rotary cutter, and deposit them away from the rotary cutter work area.

7 Claims, 2 Drawing Sheets

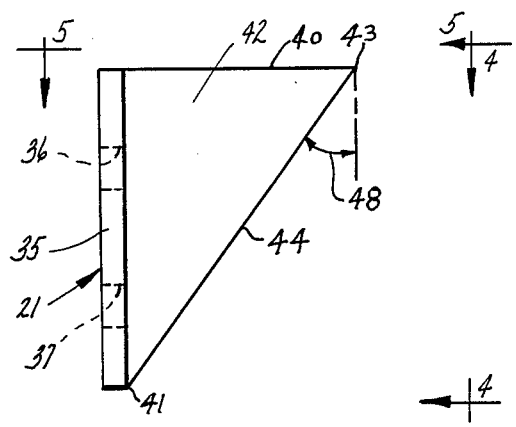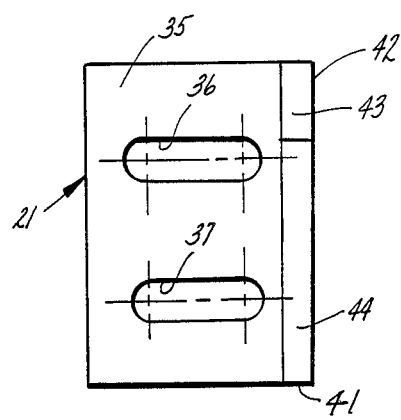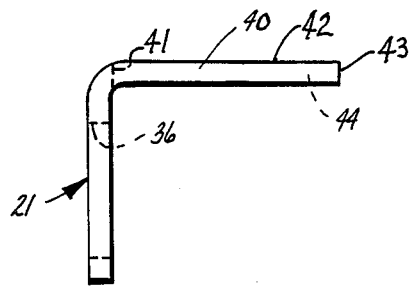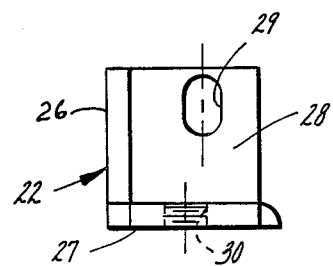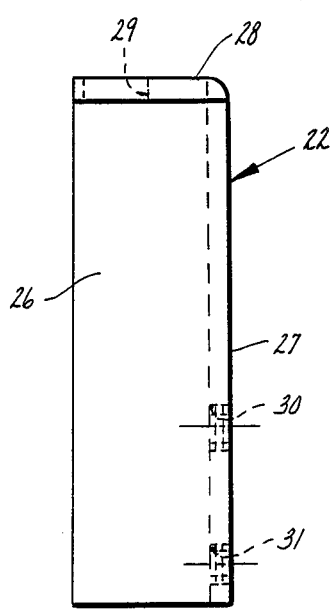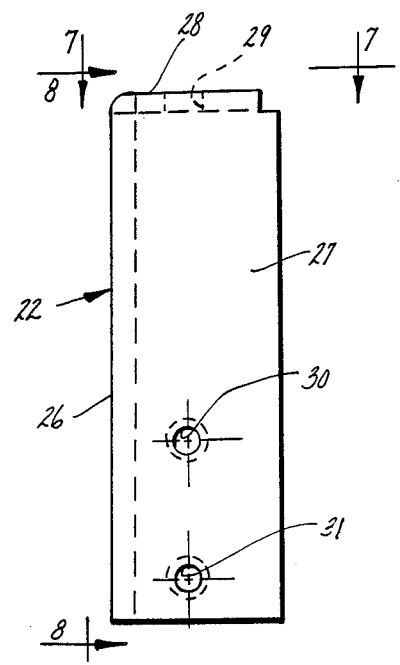

CHIP BREAKER

BACKGROUND OF THE INVENTION

1. Technical Field

The field of art to which this invention pertains may be generally located in the class of devices relating to cutting tools. Class 409, Cutting, Milling, or Planing, United States Patent Office Classification appears to be the applicable general area of art to which the subject matter similar to this invention has been classified in the past.

2. Background Information

This invention relates to a chip breaker for use with rotary cutting tools such as a drill, an annular hole cutter, a milling cutter, and the like.

Rotary cutting tools of the aforementioned type generate a long chip during a metal cutting action. Such long chips are relatively stiff and of a tight spirally round configuration so that they move upwardly through the spiral flutes of a rotary cutter. If the long chips are not broken they tend to travel up the spiral flutes of a rotary cutter and become wound around the arbor carrying the rotary cutter, which creates a retarding action and reduces the rotating rate of the rotary cutter, and requires a greater amount of power to rotate the cutter than is normally required. The operator is thus required to spend time in shutting down the machine operating the rotary cutter, so that the chips wound around the arbor may be removed. Such shut downs for removing the chips increases costs and adds to the cost of machining workpieces. The necessity of removing chips that are wound around a rotary cutter arbor also creates a definite hazzard, because the edges of the chips are usually very sharp and hence the operator is likely likely to experience cuts on his hands while removing the chips wound around the rotary cutter arbor. Winding or clogging up of the chips around a rotary cutter arbor, as described above, also entails the disadvantage of interfering with proper lubrication of a rotary cutter so that the useful life of the rotary cutter is measurably shortened.

Various chip breakers have been employed in the past in an effort to break up chips before they can wrap around an arbor carrying a rotating cutter. One such chip breaker for annular hole cutters is shown and described in U.S. Pat. No. 4,514,120. However, the chip breaker shown in the last mentioned patent is particularly adapted for use with an annular hole cutter, it is not of general use, it requires a bushing member to hold it, and it is expensive to make and time consuming to set up for use.

SUMMARY OF THE INVENTION

In accordance with the invention a chip breaker is provided which can be used with rotary cutting tools such as drills, annular hole cutters, milling cutters, and the like. The chip breaker comprises a chip breaker plate which is adjustably mounted, by a suitable support means, in an operative position closely adjacent a rotary cutter. The chip breaker plate is supported in a vertical position adjacent a rotary cutter, and it includes a front chip breaker edge which slopes rearwardly and downwardly from the front end of the chip breaker plate top edge, to the lower or bottom end of the chip breaker plate. The front edge of the chip breaker plate slopes rearwardly and downwardly at an acute angle, and it functions as a chip breaker edge. When the chip breaker plate is disposed closely adjacent a rotary cutter, long spiral chips are made by the rotary cutter as it advances into the face of a workpiece, and the chips move axially upward through the spiral flutes of the rotary cutter and flare radially outward into engagement with the sloping chip breaker edge where they are broken and separated from the rotary cutter, and disposed away from the rotary cutter work area. The front end of the chip breaker plate top edge is disposed parallel to the center line axis of the rotary cutter, and forwardly thereof. The bottom end of the chip breaker plate is disposed adjacent the face of a workpiece on which the rotary cutter is carrying out a machining operation. The acute angle on the chip breaker plate front edge is selected from a range of angles larger than the spiral angle of the flutes on the rotary cutter.

The chip breaker of the present invention may be used with right-handed or left-handed cutters, with respect to the direction of rotation of the rotary cutter. The chip breaker of the present invention may be used with any milling or rotary cutting tool when it is properly supported and positioned relative to the rotary tool.

BRIEF DESCRIPTION OF THE DRAWINGS

FIG. 3 is a side elevation view of a chip breaker made in accordance with the principles of the present invention.

FIG. 4 is a front elevation view of the chip breaker illustrated in FIG. 3, taken along the line 4—4 thereof, and looking in the direction of the arrows.

FIG. 5 is a top plan view of the chip breaker illustrated in FIG. 3, taken along the line 5—5 thereof, and looking in the direction of the arrows.

FIG. 6 is a front elevation view of a mounting bracket employed in the invention for holding the chip breaker in an operative position on a machine tool, relative to a rotary cutter.

FIG. 7 is a top plan view of the mounting bracket structure shown in FIG. 6, taken along the line 7—7 thereof, and looking in the direction of the arrows.

FIG. 8 is a left side elevation view of the mounting bracket structure illustrated in FIG. 6, taken along the line 8—8 thereof, and looking in the direction of the arrows.

DESCRIPTION OF THE PREFERRED EMBODIMENT

Figure 1:
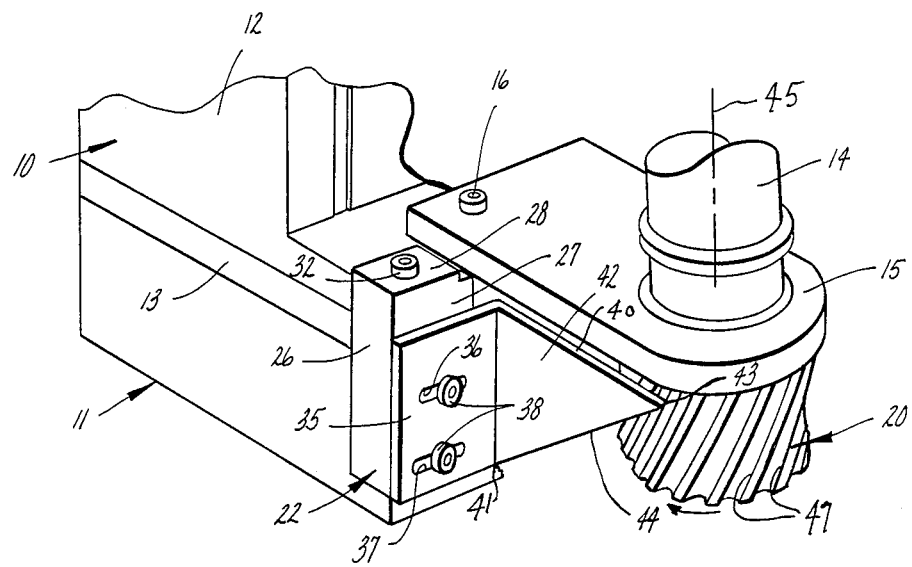
FIG. 1 is a fragmentary, perspective view of a conventional magnetic drill provided with a first type of rotary cutter and a chip breaker made in accordance with the principles of the present invention.

Referring now to the drawings, and in particular to FIG. 1, the numeral 10 generally designates a conventional magnetic drill. The numeral 11 generally designates a conventional magnet of such a drill on which is mounted the usual drill stand 12 by means of a mounting plate 13.

The numeral 14 designates a conventional arbor on which is carried a first illustrative type of rotary cutter, generally indicated by the numeral 20. The arbor 14 is supported by a conventional arbor plate 15 which is fixedly secured to the drill stand by suitable bolts 16.

The numeral 21 in FIG. 1, generally designates a chip breaker made in accordance with the principles of the present invention. The numeral 22 generally designates a chip breaker mounting bracket for mounting the chip breaker 21 on the drill 10.

As shown in FIGS. 6, 7 and 8, the chip breaker mounting bracket 22 includes a side plate 26, a front plate 27 and a top plate 28, which are fixedly secured together by any suitable means, as by welding. As shown in FIG. 1, the chip breaker mounting bracket 22 is secured to the drill stand 12 by a suitable bolt 32 which passes downwardly through an elongated slot 29 (FIG. 7) in the chip breaker mounting bracket top wall 28 and into a suitable threaded hole (not shown) in the drill stand 12. As shown in Figures 6 and 8, the front plate 27 of the chip breaker mounting bracket 22 is provided with a pair of threaded holes 30 and 31.

As shown in FIGS. 3, 4 and 5, the chip breaker 21 includes an attachment plate 35 which is provided with a pair of vertically spaced apart, transverse adjustment slots 36 and 37. The chip breaker 21 further includes a forwardly extended vertical chip breaker plate 42 which is integral with the attachment plate 35 and is disposed at a right angle relative to the attachment plate 35. As shown in FIG. 3, the illustrated chip breaker plate 42 is triangular in side elevation view. The attachment plate 35 is adjustably mounted, for sidewise adjustment, on the mounting bracket 22 by a pair of clamp bolts 38 which pass through the adjustment slots 36 and 37, and into the threaded holes 30 and 31 in the mounting bracket 22, to form a support means for the chip breaker plate 42. As shown in FIG. 3, the front chip breaking edge of the chip breaker plate 42 comprises a rearwardly sloping chip breaker edge 44. The upper end of the chip breaker edge 44 terminates at the front end 43 of the chip breaker plate top edge 40. The lower end of the chip breaker edge 44 terminates at the lower end or bottom end 41 of the chip breaker plate 42.

Figure 2:
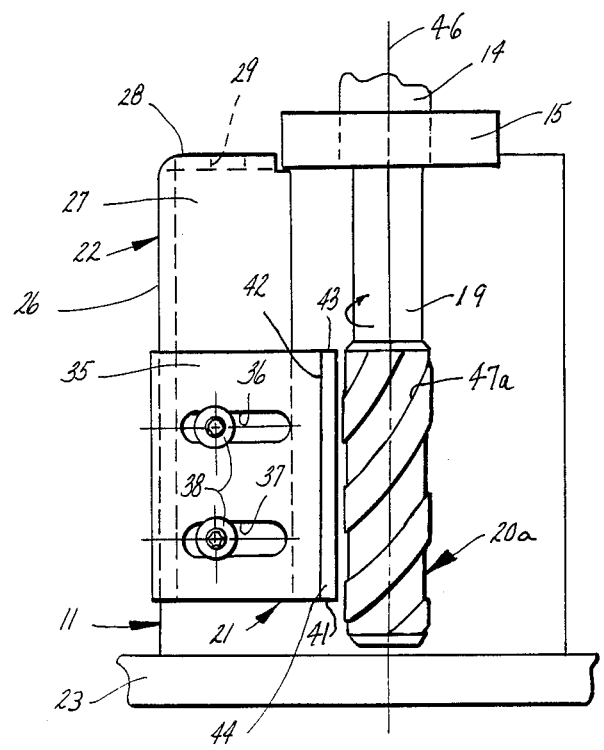
FIG. 2 is a fragmentary, front elevation view of a conventional portable drill with a magnetic base and showing a second type of rotary cutter provided with a chip breaker made in accordance with the principles of the present invention.

FIG. 1 shows the chip breaker plate 42 disposed on a vertical plane, parallel to the center line axis 45 of the rotary cutter 20. FIG. 2 shows the chip breaker plate 42 disposed on a vertical plane, parallel to the center line axis 46 of a rotary cutter 20a and its shank 19. The rotary cutter 20a is of a slightly different type as compared to the rotary cutter 20 in FIG. 1. The rotary cutter 20a in FIG. 2 is longer and smaller in diameter than the rotary cutter 20 in FIG. 1. The numeral 47 in FIG. 1 designates the spiral flutes formed on the longitudinal sides of the rotary cutter 20. The numeral 47a indicates similar spiral flutes formed on the rotary cutter 20a. The numeral 23 in FIG. 2 designates a workpiece in which a hole is to be cut by the rotating operation of the rotary cutter 20a as it is moved downwardly into the workpiece 23 in a conventional manner.

The chip breaker 21 of the present invention has been successfully used with a rotary cutter forming a hole in carbon steel, aluminum and stainless steel, and other materials.

In use, the chip breaker 21 is disposed so that the front end 43 of the chip breaker plate top edge 40 is disposed forwardly of the center line axes 45 (in FIG. 1), and 46 (in FIG. 2), by a distance of between not less than one-eighth of an inch nor more than one-half of an inch. The chip breaker plate 42 is also disposed parallel to the center line axes 45 and 46 of the rotary cutters 20 and 21a, respectively. The chip breaker plate 42 should be disposed close to the rotary cutters 20 or 20a, within approximately one-sixteenth of an inch, when the diameter of the rotary cutters 20, 20a is larger than the diameter of the arbor 14 or shank 19, respectively. When the cutters 20, 20a, are smaller in diameter than the diameter of the arbor 14 or shank 19, the chip breaker plate 42 should be disposed within one-sixteenth of an inch of the arbors outside diameter, so that the breaker plate 42 does not interfere with the arbor's or shank's normal rotative movement.

The bottom end or lower end 41 of the chip breaker edge 44 should be disposed at a clearance distance above a workpiece, as 23, suitable for clearance of the work and good manufacturing practice. However, a clearance of about onehalf of an inch has been found to be an optimum clearance distance for the lower end or bottom end 41 of the chip breaker edge 44 above the top of a workpiece 23.

The chip breaking, sloping front edge 44 on the front of the chip breaker plate 42 is formed at an acute angle, indicated by the numeral 48 in FIG. 3. Angle 48 is an acute angle relative to the cutter center line axis 45, and it slopes rearwardly and downwardly. The angle 48 on the chip breaker plate 42 is determined by the angle of the spiral flutes 47 and 47a on a particular cutter. It has been found that the angle 48 on the chip breaker edge 44 should be made in the range of from 5 degrees to 10 degrees larger than the angle of the spiral flutes 47, 47a, in the particular cutter with which the chip breaker 21 is being used. It has been found that when the angle 48 on the chip breaker edge 44 is made approximately to the same angle as the spiral flutes 47, 47a, or less than the same angle as the cutter flutes angle, that the chips being cut from a workpiece will pass the breaker edge 44 and wrap around the cutter arbor. The chip breaker 21 of the present invention is adapted to be used on rotary cutters having spiral flute angles of from 36 degrees down to 1 degree, and may be modified for larger flute angles.

In use, the chip breaker edge 44 engages the chips being moved upwardly from a hole made in a workpiece 23 by a cutter and provides a shearing action which causes the chips or shavings to be separated from the cutter and to be broken and deposited away from the cutter work area. The chip breaker 21 may be made from any suitable material, as for example high speed steel. The chip breaker edge 44 may be tipped with a carbide material.

The chip breaker 21 of the present invention may be disposed left-handed or right-handed with respect to the drill stand 12, when using right or left hand cutters, drills, respectively.

What is claimed is:

1. A chip breaker for use with a rotary cutter having a center line axis for performing a metal cutting operation on a workpiece by advancing the rotary cutter into the face of a workpiece, the rotary cutter being of the type provided with a plurality of cutting teeth spaced circumferentially around the leading end of the rotary cutter and a plurality of spiral flutes extending upwardly from the rotary cutter leading end around the outer periphery of the rotary cutter, comprising:
   (a) a chip breaker plate having a chip breaker front edge;
   (b) means for supporting the chip breaker plate in a vertical position closely adjacent a rotary cutter;
   (c) said chip breaker plate being disposed closely adjacent to the face of a workpiece; and (d) said chip breaker plate chip breaker front edge sloping rearwardly and downwardly at an acute angle and terminating at the bottom end of the chip breaker plate, whereby when the rotary cutter is rotated, chips cut by the rotary cutter move axially upward through the spiral flutes of the rotary cutter and flare radially outward into engagement with the sloping chip breaker front edge and are broken and separated from the rotary cutter and deposited away from the rotary cutter work area.

2. A chip breaker for a rotary cutter as defined in claim 1, wherein:
    (a) the chip breaker plate is triangularly shaped in side elevation view, with the top edge being horizontally disposed.

3. A chip breaker for a rotary cutter as defined in claim 1, wherein:
    (a) the front end of the chip breaker plate top edge is disposed forwardly of the center line axis of the rotary cutter a distance selected from a range of one-eighth of an inch to one-half of an inch.

4. A chip breaker for a rotary cutter as defined in claim 3, wherein:
    (a) the acute angle of the chip breaker plate chip breaker front edge is selected from a range of 5 degrees to 10 degrees larger than the angle of the spiral flutes on the rotary cutter.

5. A chip breaker for a rotary cutter as defined in claim 4, wherein:
    (a) the chip breaker plate is disposed within about one-sixteenth of an inch from the rotary cutter when the rotary cutter is carried by an arbor having a diameter smaller than the diameter of the rotary cutter.

6. A chip breaker for a rotary cutter as defined in claim 4, wherein:
    (a) when the rotary cutter is carried by an arbor having a diameter larger than the rotary cutter diameter, the chip breaker plate is disposed within about one-sixteenth of an inch from the arbor.

7. A chip breaker for a rotary cutter as defined in claim 4, wherein:
    (a) said chip breaker plate is adjustably mounted on said supporting means.

* * * * *